(12) United States Patent
Sultan et al.

(10) Patent No.: US 10,570,609 B2
(45) Date of Patent: Feb. 25, 2020

(54) SYSTEMS AND METHODS FOR JOINING COMPOSITE PANELS

(71) Applicant: The Boeing Company, Chicago, IL (US)

(72) Inventors: Saif Sultan, Bothell, WA (US); Sean R. Cysewski, Snohomish, WA (US); John N. Keune, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/788,425

(22) Filed: Oct. 19, 2017

(65) Prior Publication Data

US 2019/0119904 A1    Apr. 25, 2019

(51) Int. Cl.

| | |
|---|---|
| *E04B 1/38* | (2006.01) |
| *E04B 1/41* | (2006.01) |
| *E04B 2/74* | (2006.01) |
| *F16B 5/06* | (2006.01) |
| *F16B 5/12* | (2006.01) |
| *B65D 6/00* | (2006.01) |
| *F16B 2/06* | (2006.01) |

(52) U.S. Cl.
CPC ............. *E04B 1/40* (2013.01); *B65D 11/00* (2013.01); *E04B 2/7401* (2013.01); *F16B 2/065* (2013.01); *F16B 5/0614* (2013.01); *F16B 5/121* (2013.01)

(58) Field of Classification Search
CPC ..... E04B 1/40; E04B 2/7401; Y10T 24/44026
USPC ............................................ 248/316.5, 316.6
See application file for complete search history.

(56) References Cited

U.S. PATENT DOCUMENTS

| | | | | |
|---|---|---|---|---|
| 1,973,536 A | * | 9/1934 | Mack ................... | A63H 33/062 403/171 |
| 3,082,897 A | * | 3/1963 | Highley .................. | B65D 9/32 217/65 |
| 3,120,078 A | * | 2/1964 | Bessinger ............ | A63H 33/102 29/270 |
| 3,323,674 A | * | 6/1967 | Nist, Jr. ................... | B65D 9/24 217/12 R |
| 3,822,924 A | * | 7/1974 | Lust .................... | A47B 47/0041 312/108 |
| 4,233,656 A | * | 11/1980 | Shemitz ..................... | F21V 1/00 362/352 |
| 4,343,117 A | * | 8/1982 | Shemitz ............. | A47B 47/0075 211/118 |
| 4,453,471 A | * | 6/1984 | Harrington .............. | B65D 9/24 108/55.1 |
| 4,478,381 A | * | 10/1984 | Pittion ...................... | F16L 3/12 24/487 |

(Continued)

FOREIGN PATENT DOCUMENTS

JP    8-49326    *    2/1996

*Primary Examiner* — Adriana Figueroa
(74) *Attorney, Agent, or Firm* — Parsons Behle & Latimer

(57) ABSTRACT

Disclosed embodiments include a structural assembly having a first panel having a first edge and a first aperture adjacent to the first edge, and a clamp having a first piece that passes through the first aperture, a second piece, and a fastening portion that fastens together the first piece and the second piece. The structural assembly may include a second panel having a second edge and a second aperture adjacent to the second edge, and the second piece passes through the second aperture, and the clamp holds the first panel and the second panel together.

20 Claims, 6 Drawing Sheets

(56) References Cited

U.S. PATENT DOCUMENTS

| | | | | |
|---|---|---|---|---|
| 4,609,116 A * | 9/1986 | Simms | ............... | B65D 9/12 |
| | | | | 206/600 |
| 4,779,751 A * | 10/1988 | Munroe | ............ | B65D 5/448 |
| | | | | 217/69 |
| 4,840,345 A * | 6/1989 | Neil | ............ | F16L 3/12 |
| | | | | 24/16 PB |
| 5,354,589 A * | 10/1994 | Wass | ............ | E05D 1/02 |
| | | | | 160/231.1 |
| 6,203,235 B1 * | 3/2001 | Bonde | ............ | B65D 9/24 |
| | | | | 16/384 |
| 7,325,776 B2 * | 2/2008 | Shibuya | ............ | F16L 3/1016 |
| | | | | 24/284 |
| 7,963,487 B2 * | 6/2011 | Saltenberger | ...... | F16L 3/1075 |
| | | | | 24/16 PB |
| 8,961,340 B2 * | 2/2015 | Boatwright | ...... | A63B 59/0044 |
| | | | | 473/568 |
| 9,012,791 B2 * | 4/2015 | Smith | ............ | H02G 3/22 |
| | | | | 174/664 |
| 9,157,235 B1 * | 10/2015 | Garvey | ............ | E04B 1/3211 |
| 2012/0273640 A1 * | 11/2012 | Fathi | ............ | A44B 15/005 |
| | | | | 248/316.5 |

* cited by examiner

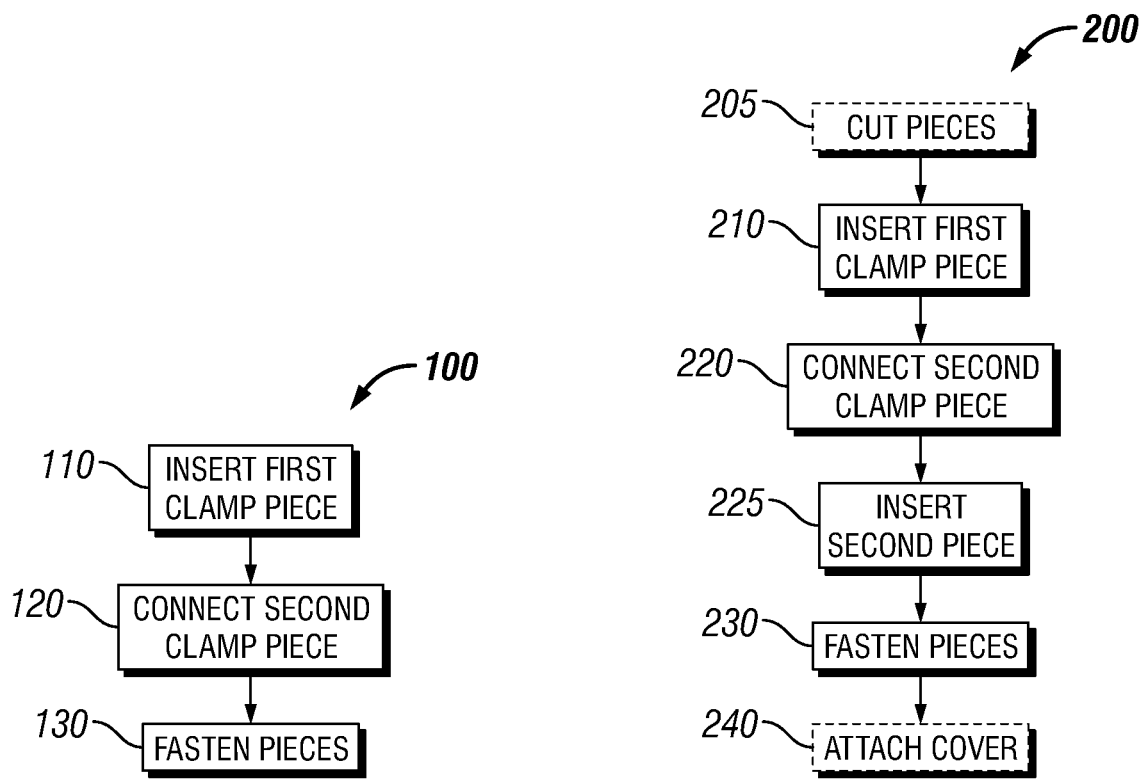
FIG. 10
FIG. 11
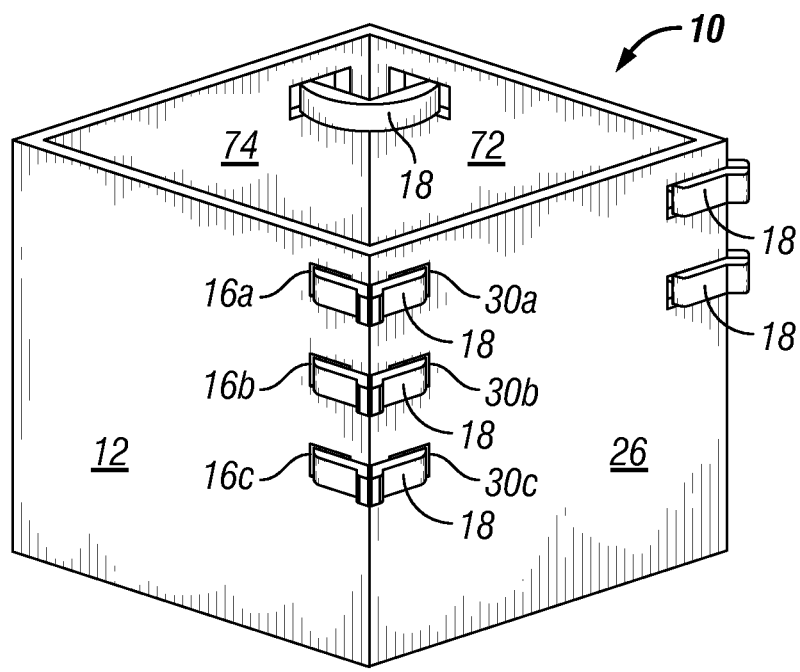
FIG. 12

SYSTEMS AND METHODS FOR JOINING COMPOSITE PANELS

FIELD OF THE DISCLOSURE

This disclosure relates generally to systems and methods for joining structural panels together. In particular, the disclosure relates to systems and methods for mechanically joining composite panels.

BACKGROUND

Existing systems and methods for joining panels together, especially composite panels, include gluing the panels together with an adhesive. Gluing can be inefficient. For example, gluing may require curing time for the adhesive, or additional post-gluing processes may be required, such as sweep and sand to fill gaps or cover bumps created by expanding glue, or a solvent may need to be applied to remove any glue squeeze-out.

In addition, existing systems and methods for joining panels include cutting a "tab," or extension, in one panel and a "slot," or hole, in another to assist alignment during gluing. However, this assembly process typically creates mark-off on the panel surfaces that requires sweep and sand before applying a decorative finish. When the whole product needs to be assembled (using tab and slot) and swept and sanded before applying the finish it can limit the types of finishes used to those that can be applied after assembly is complete, such as decorative laminates with pre-applied, pressure sensitive adhesives, or the like. Other issues and drawbacks with existing systems and methods also may exist.

SUMMARY

Accordingly, the disclosed systems and methods address the above-noted, and other, issues. Disclosed embodiments include a structural assembly having a first panel having a first edge and a first aperture adjacent to the first edge, and a clamp having a first piece that passes through the first aperture, a second piece, and a fastening portion that fastens together the first piece and the second piece.

Disclosed embodiments further include a second panel having a second edge and a second aperture adjacent to the second edge, and the second piece passes through the second aperture, and the clamp holds the first panel and the second panel together. In further disclosed embodiments the first panel and the second panel are held together with an angle of 85 to 95 degrees between them.

Disclosed embodiments include a clamp having a first interlock portion at an opposite end of the first piece from the fastening portion, a second interlock portion at an opposite end of the second piece from the fastening portion, and the first interlock portion and the second interlock portion couple together.

Disclosed embodiments include a clamp having a first joint portion at an opposite end of the first piece from the fastening portion, a second joint portion at an opposite end of the second piece from the fastening portion, and wherein the first joint portion and the second joint portion fasten together.

Disclosed embodiments include a clamp having a bending portion between the first piece and the second piece that bends to allow fastening of the fastening portion.

Further disclosed embodiments include a clamp for fastening panels, the clamp having a first piece having a first connection end and a first fastening end, a second piece having a second connection end and a second fastening end, and wherein at least a portion of the first piece fits into an aperture in a panel, and wherein the first connection end connects with the second connection end, and wherein the first fastening end and the second fastening end are fastened together to secure the clamp.

Disclosed embodiments of the clamp further include a first interlocking joint half formed at the first connection end, a second interlocking joint half formed at the second connection end, and wherein the first interlocking joint half and the second interlocking joint half couple together.

In further disclosed embodiments the first interlocking joint half and the second interlocking joint half couple together with a friction fit. In other disclosed embodiments the first interlocking joint half and the second interlocking joint half couple together with at least one fastener. In still further embodiments, there is a bending member between the first connection end and the second connection end, and bending of the bending member enables the first fastening end and the second fastening end to be fastened together.

Further disclosed embodiments of the clamp include an angled support piece formed in the second piece. In some embodiments, the angled support piece is formed substantially at a right angle.

Also disclosed are methods of assembling a structure. Embodiments of the method include inserting a first piece of a clamp through a first aperture in a first panel, connecting a second piece of the clamp to a first end of the first piece, and fastening together a second end of the first piece and the second piece.

The method may also include inserting the second piece of the clamp through a second aperture in a second panel prior to the fastening step. Further embodiments of the method include attaching a cover piece to the clamp.

Disclosed embodiments of the step of connecting further include coupling a first interlock portion located at an opposite end of the first piece from a fastening portion to a second interlock portion located at an opposite end of the second piece from a fastening portion.

Further disclosed embodiments of the connecting step further include fastening a first joint portion located at an opposite end of the first piece from a fastening portion to a second joint portion located at an opposite end of the second piece from a fastening portion.

Further disclosed embodiments of the connecting step further include providing a bending portion between the first piece and the second piece that bends to allow fastening of the second end of the first piece and the second piece.

Disclosed embodiments of the method further include a step of cutting the clamp to size prior to the inserting step. Other embodiments, advantages, and features also exist as will be apparent to those of skill in the art.

BRIEF DESCRIPTION OF THE DRAWINGS

FIG. 10 is a schematic flow chart illustrating a method of assembling a structural assembly in accordance with disclosed embodiments.

FIG. 11 is a schematic flow chart illustrating a method of assembling a structural assembly in accordance with disclosed embodiments.

FIG. 12 is a schematic perspective view of a structural assembly in accordance with disclosed embodiments.

Figure 1:
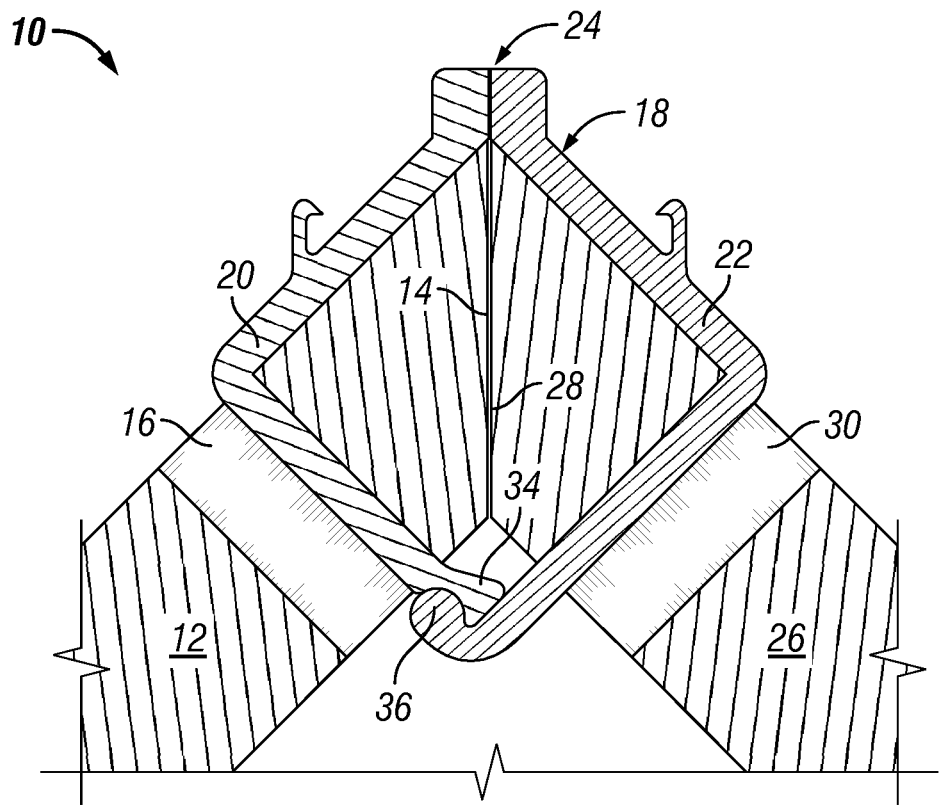
FIG. 1 is a cross-sectional, top-down view of a structural assembly in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a cross-sectional, top-down view of a structural assembly 10 in accordance with disclosed embodiments. As shown, structural assembly 10 may comprise a first panel 12 and a second panel 26 held together by a clamp 18. First panel 12 may have a first edge 14, in this example mitered at 45 degrees, to mate with a second edge 28, also mitered at 45 degrees, to form a 90 degree corner. Of course, as would be understood by one of ordinary skill in the art having the benefit of this disclosure, other angles, including a zero angle, may be formed between the first panel 12 and second panel 26 as desired, and the first edge 14 and second edge 28 need not be mitered.

As also illustrated, first panel 12 may comprise a first aperture 16 and second panel 26 may comprise a second aperture 30. The apertures 16, 30 may be precut into the respective panels 12, 26, or they may be cut on-site during assembly as desired. Further, while illustrated herein as generally rectangular, other shapes and sizes for apertures 16, 30 may also be used as desired. Generally, apertures 16, 30 allow at least a portion of clamp 18 to pass through the panels 12, 26.

As shown in FIG. 1, embodiments of clamp 18 may comprise a first piece 20 and a second piece 22. First piece 20 passes from the outside of first panel 12 through first aperture 16 and second piece 22 passes from the outside of second panel 26 through second aperture 30. Of course, as used herein the terms "outside" and "inside" are relative and will vary depending on the particular configuration of the structural assembly 10 being assembled. In some embodiments, first piece 20 and second piece 22 meet on the inside of the panels 12, 26 at a first interlock portion 34 of the first piece 22 and a second interlock portion 36 of the second piece. As shown, first interlock portion 34 is shaped to mate with second interlock portion 36 and cooperatively fasten the pieces 20, 22 together on the inside of the panels 12, 26.

On the outside of the panels 12, 26 the pieces 20, 22 of clamp 18 meet at a fastening portion 24. Fastening portion 24 is used to secure the pieces 20, 22 of clamp 18 together and in place. Fastening may be accomplished by any suitable fastener 62, for example, as shown in FIG. 2, one or more screws, bolts, rivets, pins, staples, clips, zip ties, welds, adhesives, or the like may be used to secure fastening portion 24.

Figure 2:
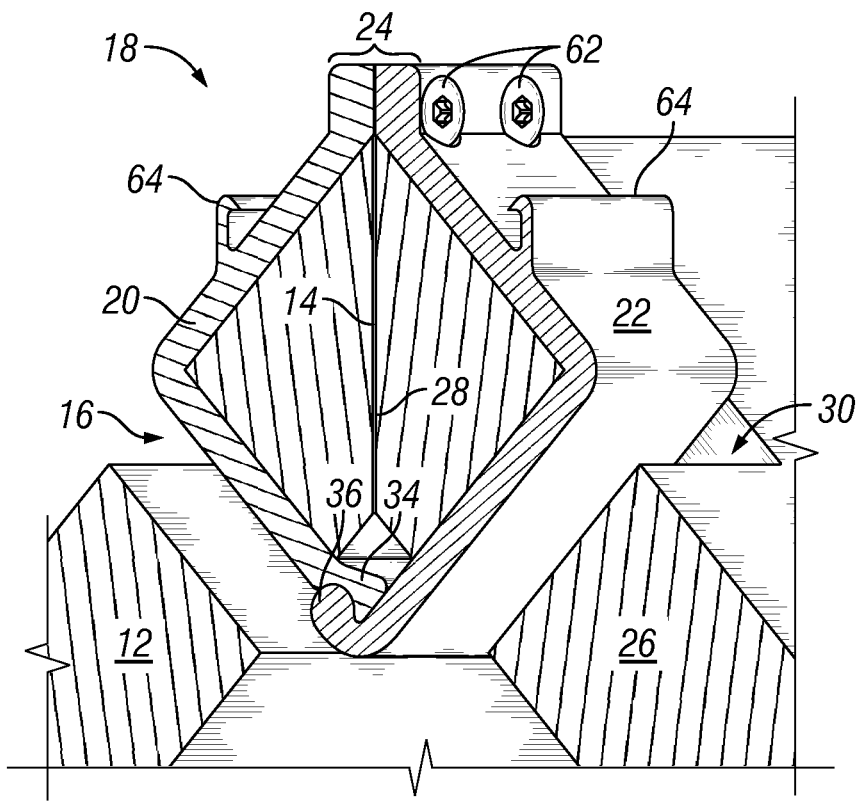
FIG. 2 is a cross-sectional, perspective view of a structural assembly in accordance with disclosed embodiments.
Figure 3:
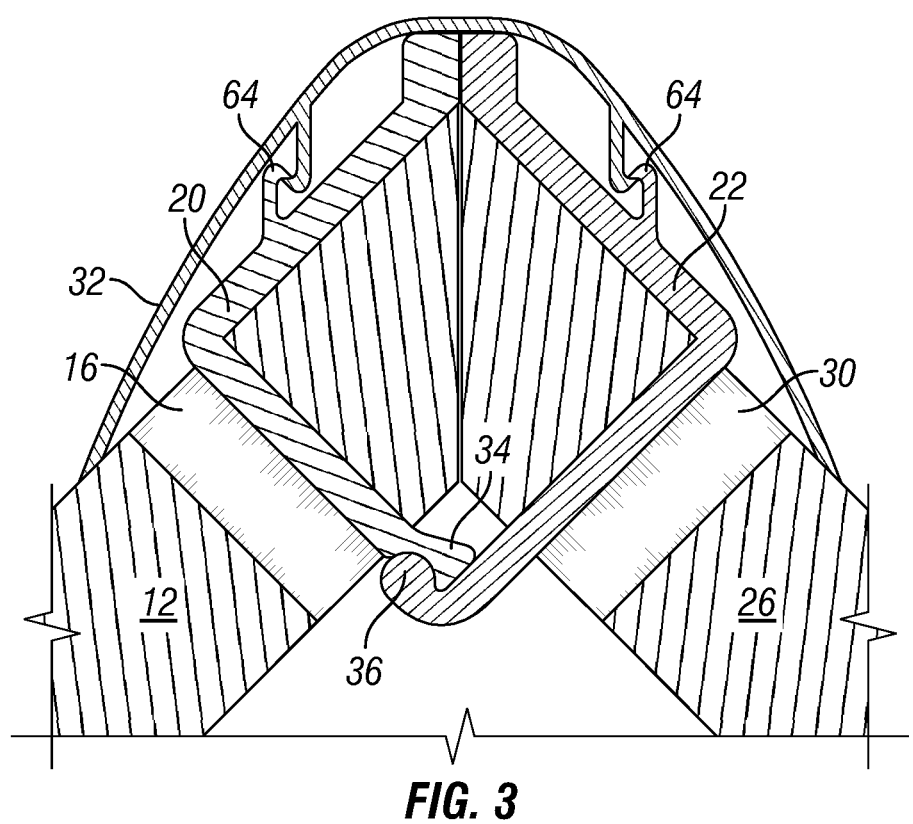
FIG. 3 is a cross-sectional, top-down view of a structural assembly including a cover piece in accordance with disclosed embodiments.

As also shown in FIGS. 2-3, one or more of the first piece 20 and second piece 22 may have a rail 64, or other attachment piece, that enables a cover piece 32, or other decorative, safety, or protective piece to be attached to the structural assembly 10. Rail 64 and cover piece 32 are shown having interlocking hook attachments for illustrative purposes, however, other configurations are also possible.

Figure 4:
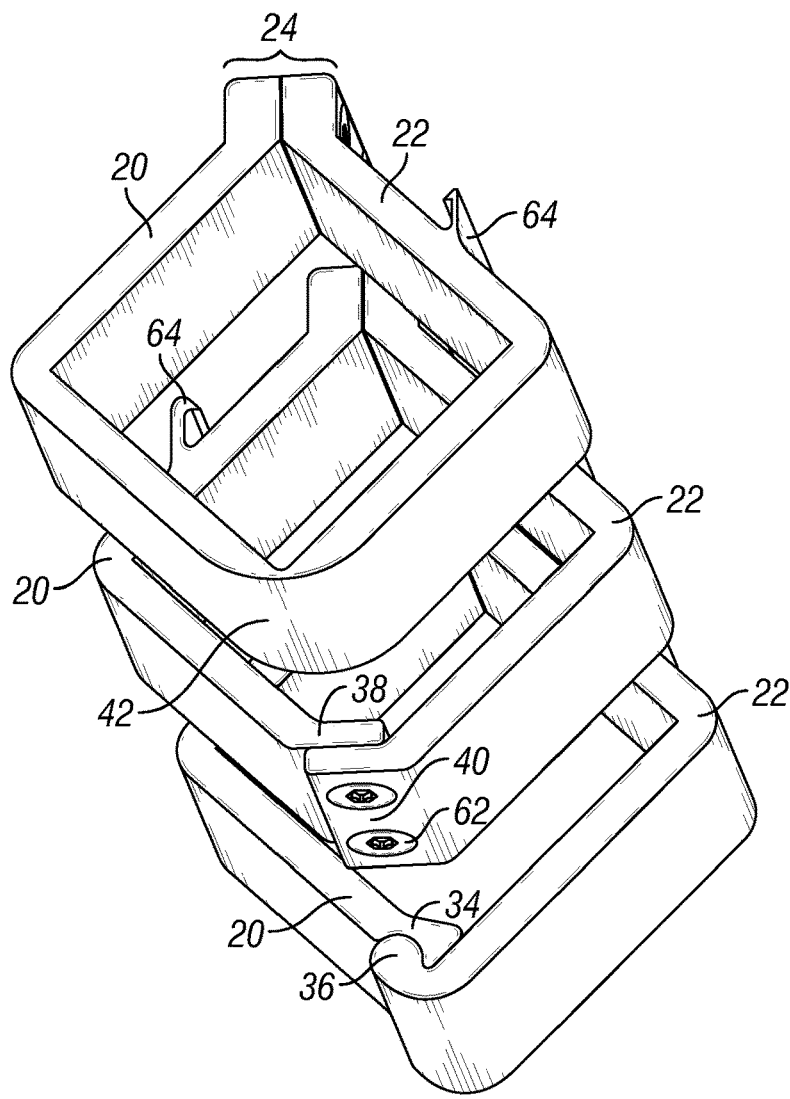
FIG. 4 is a perspective view of clamps in accordance with disclosed embodiments.

FIG. 4 shows embodiments of clamp 18 in accordance with the disclosure. As shown, clamp 18 may comprise a first piece 20, a second piece 22, a first interlock portion 34, and a second interlock portion 36. Embodiments of clamp 18 may also comprise a first joint portion 38 and a second joint portion 40. Joint portions 38, 40 may be fastened together using fasteners 62 or the like. Of course, the shapes and configuration of the interlocking portions 34, 36 and joint portions 38, 40 may vary as desired. Embodiments of clamp 18 may also comprise a bending portion 42 in between the first piece 20 and second piece 22 that bends to allow fastening of the fastening portion 24. Bending portion 42 may comprise an integral section of clamp 18 that has less material (i.e., thinner cross-section) enabling it to bend, a separate piece of flexible material (e.g., rubber or plastic) that connects the ends of the pieces 20, 22, or another configuration may be used.

Figure 5:
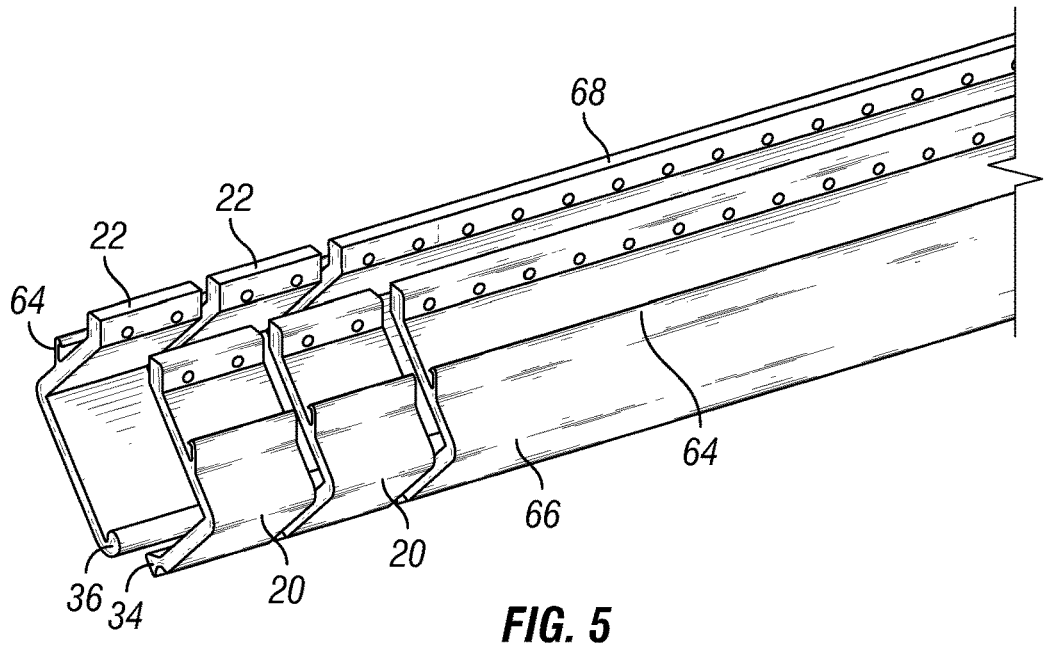
FIG. 5 is a perspective view illustrating a method for creating clamp pieces from bars of material in accordance with disclosed embodiments.

FIG. 5 is a perspective view illustrating a method for creating first pieces 20 and second pieces 22 from bars of material. As illustrated, embodiments of clamp 18 may be created by cutting to size a first bar 66 of material that has been extruded, cast, milled, injection molded, or otherwise formed with the profile for the first pieces 20 of clamp 18. Likewise, a second bar 68 of material that has been extruded, cast, milled, injection molded, or otherwise formed with the profile for the second pieces 22 of clamp 18 may be cut to size. Among other things, this disclosed method enables clamps 18 to be cut to size "on site" where manufacturing of the structural assembly 10 is taking place; it also enables the size of the clamps 18 to be varied and custom fit on site. Embodiments of bars 66, 68 may comprise any suitable material such as aluminum, steel, alloys, metals, plastics, composites, or the like.

Figure 6:
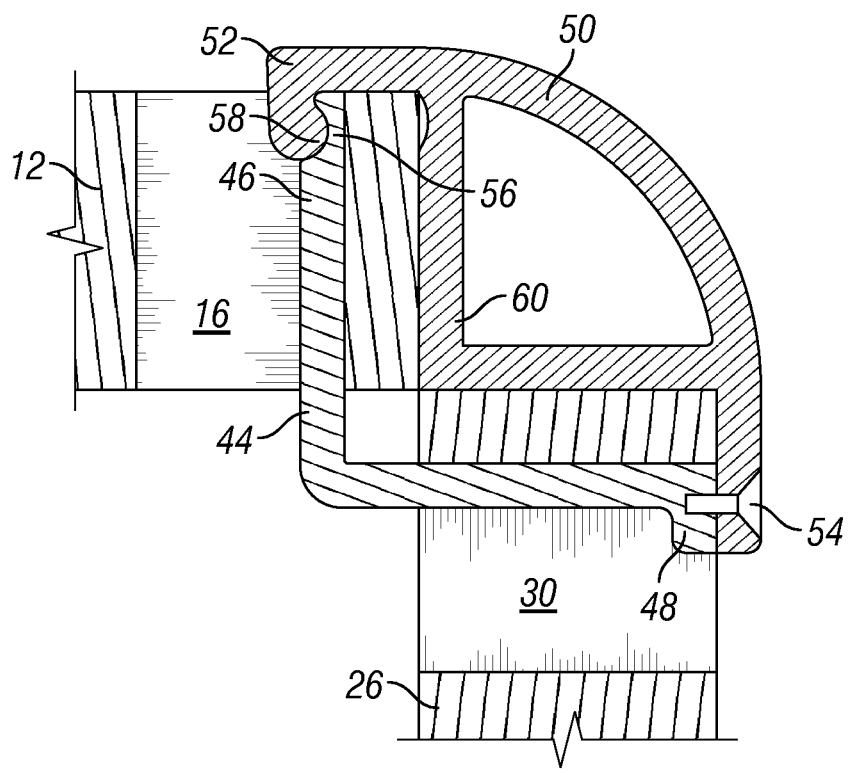
FIG. 6 is a cross-sectional, top-down view of a structural assembly in accordance with disclosed embodiments.

FIG. 6 is a cross-sectional, top-down view of a structural assembly 10 in accordance with disclosed embodiments. As shown, embodiments of clamp 18 may comprise a first piece 44 that is shaped to pass through both apertures 16, 30 and interlock and fasten with a second piece 50. As shown, interlocking may be accomplished by interlocking first interlocking joint half 56 on first connection end 46 with second interlocking joint half 58 on second connection end 52. Fastening may be accomplished by use of a fastener 62 to fasten first fastening end 48 to second fastening end 54. Embodiments of second piece 50 may also comprise an angled support piece 60 configured, among other things, to hold first panel 12 and second panel 26 at a desired angle. For example, angled support piece may hold the panels 12, 26 at an angle from approximately 85-95 degrees, with 90 degrees being preferable for rectangular structural assemblies 10. Other angles may be used for other configurations of structural assemblies 10.

Figure 7:
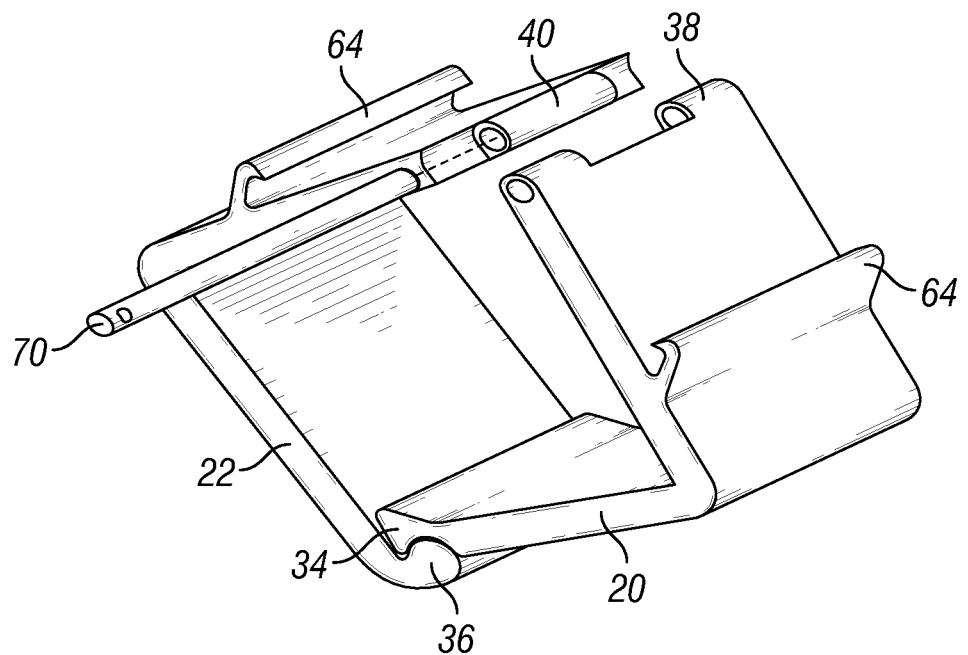
FIG. 7 is a perspective view of an embodiment of a clamp in accordance with the disclosure.

FIG. 7 is a perspective view of an embodiment of clamp 18 in accordance with the disclosure. As shown, clamp 18 may comprise a first piece 20, a second piece 22, first joint portion 38, and a second joint portion 40. Joint portions 38, 40 may interlock together and may be held in place by pin 70, or the like. Other configurations are also possible.

Figure 8:
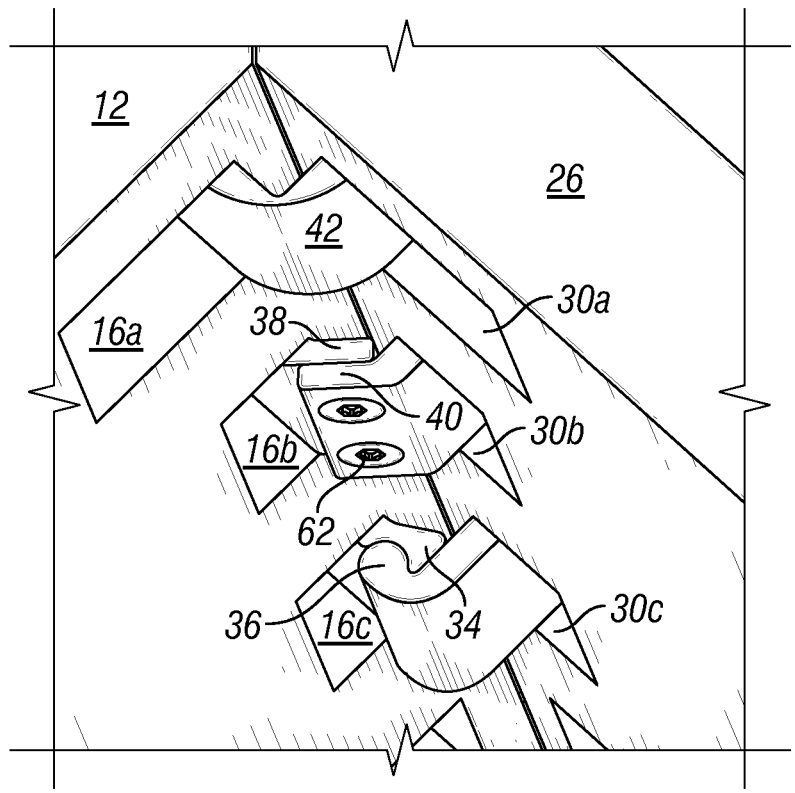
FIG. 8 is a perspective view of a portion of a structural assembly in accordance with the disclosure.

FIG. 8 is a perspective view of a portion of a structural assembly 10 in accordance with the disclosure. As shown, an inside corner of a structural assembly 10 is formed by cutting a number of first apertures 16a, 16b, 16c, etc., into a first panel 12, and a number of second apertures 30a, 30b, 30c, etc., into a second panel 26. Panels 12, 26 may comprise carbon-fiberglass honeycomb panels, or the like. First apertures 16a, 16b, 16c, and second apertures 30a, 30b, 30c may be pre-cut into panels 12, 26, or may be cut by an assembler during assembly. As also shown, clamps 18 are inserted into the apertures 16a, 16b, 16c, 30a, 30b, 30c and fastened on the opposite side (not visible in FIG. 8). In some embodiments, adhesives may be added to the juncture between panels 12, 26, or in apertures 16a, 16b, 16c, 30a, 30b, 30c to assist holding the structural assembly 10 together.

FIG. 8 shows the use of a variety of embodiments for clamp 18 for illustrative purposes. In practice, a uniform type of clamp 18 may be used to assemble structural assembly 10. Likewise, the size, type, and number of clamps 18 used may vary according to the type of structural assembly 10, the anticipated load on the structure, the type of covering or finish to be applied, or other considerations.

Figure 9:
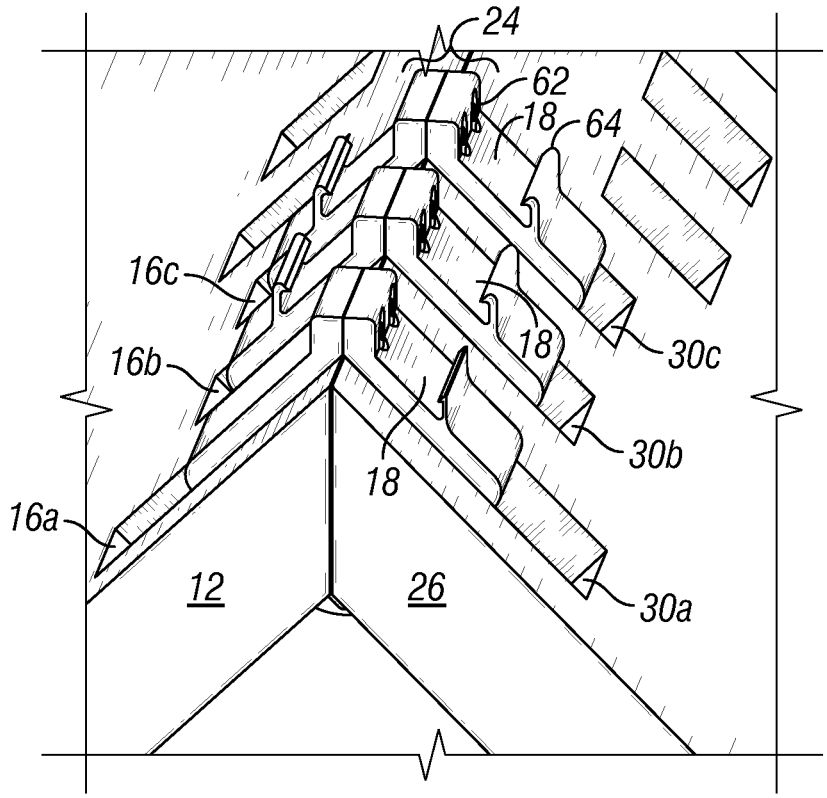
FIG. 9 is a perspective view of a portion of a structural assembly in accordance with the disclosure.

FIG. 9 is a perspective view of a portion of a structural assembly 10 in accordance with the disclosure. As shown, an outside corner of structural assembly 10 is formed by first panel 12 and second panel 26. Clamps 18 are passed through first apertures 16a, 16b, 16c, and second apertures 30a, 30b, 30c. In this exemplary embodiment, clamps 18 are fastened together at fastening portion 24 with fasteners 62. Again, the size, type, and number of clamps 18 used may vary according to the type of structural assembly 10, the anticipated load on the structure, the type of covering or finish to be applied, or other considerations.

FIG. 10 is a schematic flow chart illustrating a method 100 of assembling a structural assembly 10 in accordance with disclosed embodiments. As used herein, the terms "first" and "second" are relative and for illustrative purposes. In practice, the ordering of, and number of, pieces, panels, and the like, may vary. As shown, method 100 may comprise step 110 of inserting a first piece of a clamp through a first aperture in a first panel. At step 120, a second piece of clamp is connected to a first end of the first piece. At step 130 the second end of the second piece and a second end of the first piece are fastened together.

FIG. 11 is a schematic flow chart illustrating a method 200 of assembling a structural assembly 10 in accordance with disclosed embodiments. As shown, method 200 includes an optional step 205 in which one or more clamp pieces (e.g., 20, 22) are cut to size from a bar of material (e.g., 66, 68). At step 210 a first piece of a clamp is inserted through a first aperture in a first panel. At step 220, a second piece of clamp is connected to a first end of the first piece. At step 225 the second piece of the clamp is inserted through a second aperture in a second panel. At step 230 the second end of the second piece and a second end of the first piece are fastened together. At optional step 240 a cover, or trim piece, is installed onto the clamps (e.g., using rails 64).

As will be apparent to one of ordinary skill in the art, the above-disclosed methods can be implemented to manufacture a structural assembly 10. For example, a plurality of clamps 18 may be fastened at the edges 14, 28 of first and second panels 12, 26 to create a corner structure (e.g., with an angle between panels of approximately 85-95 degrees, with 90 degrees being preferred for rectangular structures). Likewise, and as illustrated in FIG. 12, four panels 12, 26, 72, 74 may be connected with clamps 18 to form a rectangular (or square) structural assembly 10. Of course, other numbers of panels, shapes, and configurations may also be manufactured.

Although various embodiments have been shown and described, the present disclosure is not so limited and will be understood to include all such modifications and variations would be apparent to one skilled in the art.

What is claimed is:

1. A structural assembly comprising:
   a first panel comprising a first edge and a first aperture adjacent to the first edge; and
   a two-piece clamp comprising:
      a first piece that passes through the first aperture, the first piece comprising a first interlock portion having a substantially concave shape and a first fastening portion comprising at least one fastener hole, and the first interlock portion is located at an opposite end of the first piece from the first fastening portion;
      a separate second piece comprising a second interlock portion having a substantially convex shape and located at an opposite end of the second piece from a second fastening portion, the second fastening portion comprising at least one fastener hole that enables fastening of the first fastening portion of the first piece to the second fastening portion of the second piece.

2. The structural assembly of claim 1 further comprising:
   a second panel comprising a second edge and a second aperture adjacent to the second edge; and
   wherein the second piece passes through the second aperture, and the clamp holds the first panel and the second panel together.

3. The structural assembly of claim 2 wherein the first panel and the second panel are held together with an angle of 85 to 95 degrees between them.

4. The structural assembly of claim 1 wherein the first interlock portion and the second interlock portion couple together by mating of the substantially concave shape with the substantially convex shape.

5. The structural assembly of claim 1 further comprising at least one fastener sized to fit in the at least one fastener hole.

6. The structural assembly of claim 1 wherein the two piece claim comprises aluminum.

7. The structural assembly of claim 1 wherein the two piece claim comprises plastic.

8. The structural assembly of claim 1 wherein the two piece claim comprises steel.

9. The structural assembly of claim 1 wherein the first piece is cut from a first bar having a profile shaped to have the first interlock portion on one side and the first fastening portion on an opposite side.

10. The structural assembly of claim 1 wherein the second piece is cut from a second bar having a profile shaped to have the second interlock portion on one side and the second fastening portion on an opposite side.

11. A clamp for fastening panels, the clamp comprising:
    a first piece comprising a first connection end comprising a substantially concave surface and a first fastening end comprising at least one fastener hole;
    a separate second piece comprising a second connection end comprising a substantially convex surface, a second fastening end comprising at least one fastener hole, and an angled support piece formed in the second piece in between the second connection end and the second fastening end and configured to hold panels at a predetermined angle with respect to one another when held together by the clamp; and wherein at least a portion of the first piece is shaped to fit into an aperture in at least one of the panels, and wherein the first connection end connects with the second connection end by mating of the substantially concave surface with the substantially convex surface, and wherein the at least one fastener hole on the first fastening end and the at least one fastening hole on the second fastening end are fastened together to secure the clamp.

12. The clamp of claim 11 wherein the first connection end and the second connection end couple together with a friction fit.

13. The clamp of claim 11 wherein the first connection end and the second connection end couple together with at least one fastener.

14. The clamp of claim 11 wherein the predetermined angle is substantially a right angle.

15. The clamp of claim 11 wherein the first piece is cut from a first bar having a profile shaped to have the first connection end on one side and the first fastening end on an opposite side.

16. The clamp of claim 11 wherein the second piece is cut from a second bar having a profile shaped to have the second connection end on one side and the second fastening end on an opposite side.

17. A method of assembling a structure, the method comprising:

inserting a first piece of a two-piece clamp through a first aperture in a first panel, the first piece comprising a first interlock portion having a first substantially concave shape a first fastening end comprising at least one fastener hole, and the first fastening end is located opposite of the first interlock portion;

connecting a second interlock portion of a separate second piece of the two-piece clamp, the second interlock portion comprising a substantially convex shape, to the first interlock portion of the first piece, the second piece further comprising a second fastening end opposite the second interlock portion and comprising at least one fastener hole; and fastening together the first fastening end of the first piece and the second fastening end of the second piece by installing a fastener into the at least one fastener hole.

18. The method of claim 17 further comprising:

inserting the second piece of the clamp through a second aperture in a second panel prior to the fastening step.

19. The method of claim 17 further comprising:

attaching a cover piece to the clamp.

20. The method of claim 17 further comprising the step of cutting the clamp to size prior to the inserting step.

* * * * *